S. W. RHOADS.
FRICTION CLUTCH.
APPLICATION FILED OCT. 23, 1914.
1,156,555.
Patented Oct. 12, 1915.
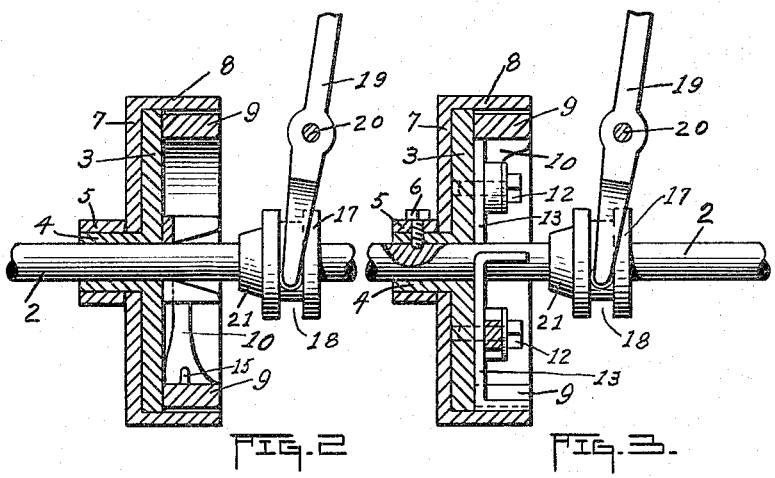
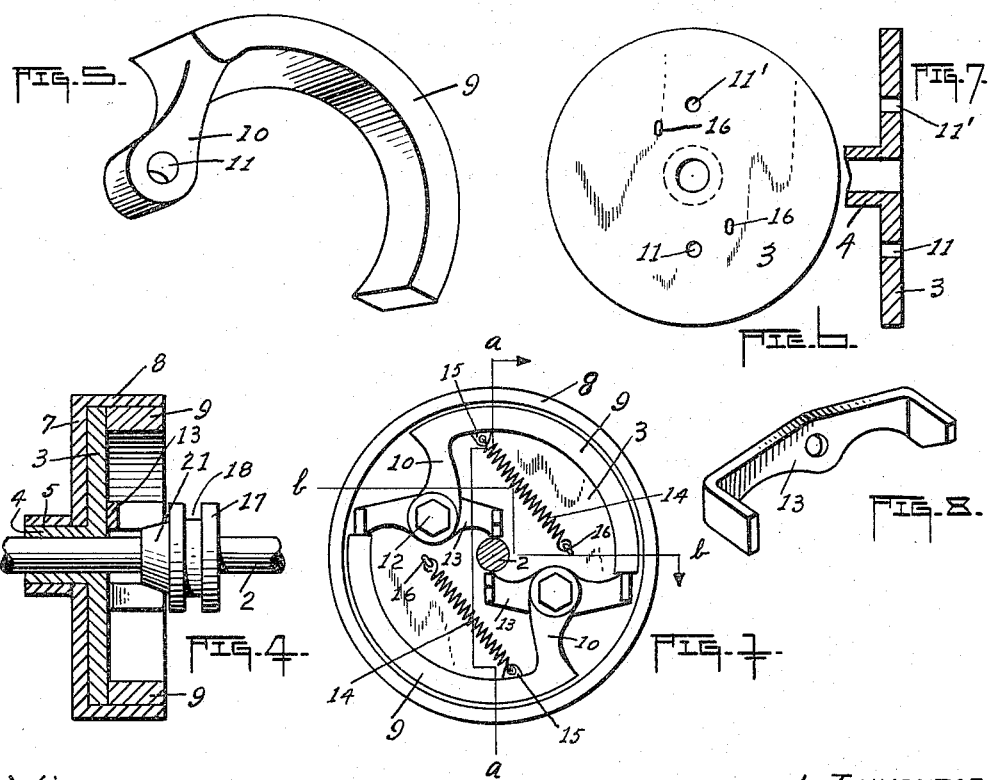

UNITED STATES PATENT OFFICE.

SAMUEL W. RHOADS, OF FARMINGTON, ILLINOIS.

FRICTION-CLUTCH.

1,156,555.　　　Specification of Letters Patent.　　Patented Oct. 12, 1915.

Application filed October 23, 1914. Serial No. 868,243.

*To all whom it may concern:*

Be it known that I, SAMUEL W. RHOADS, a citizen of the United States, residing at Farmington, in the county of Fulton and State of Illinois, have invented certain new and useful Improvements in Friction-Clutches, of which the following is a specification.

My invention relates to improvements in friction pulley clutches.

The object of my invention is to provide an improved form of pulley clutch employing the simplest means possible for clutching and unclutching the pulley to the shaft, and at the same time facilitating their ready release, and preventing centrifugal action from throwing the clutch members into contact with the pulley surface when unclutched.

My invention consists mainly in the provision of clutch members or shoes supported in a relation to the surface to be clutched, that the shifting of the latter about axes of support will cause them to be thrown outwardly to clutch and inwardly toward the driving shaft to unclutch; spring tension means for holding the clutch shoes normally out of engagement with the surface to be clutched and actuating means to cause them to be thrown outwardly and in impingement with said clutch surface.

Referring more particularly to the drawings, Figure 1 is a front elevation of the device; Fig. 2 is a sectional view of the same on the line *a—a* of Fig. 1, and similarly, Fig. 3 is a sectional view on the line *b—b* of Fig. 1, designed to show the clutch members out of engagement; Fig. 4 is a sectional view designed to show the clutch members in engagement; Fig. 5 is a detail perspective view of one of the clutch shoes; Fig. 6 is a front view of the shoe supporting disk; Fig. 7 is a sectional view of the same, and Fig. 8 is a detail perspective view of a lever or shifting arm.

I am aware that heretofore clutches have been produced employing clutch shoes, but am not aware of any clutch shoe having been employed in which the clutch action is effected through the eccentric action of the same to cause it to move as a body into different concentric circles for effecting the uniform bearing of its entire surface upon the surface to be clutched. And therefore, it is to this particular feature of improvement that my invention is directed. Also, my invention involves certain details for effecting such action that are embraced therein.

Referring to the drawings, 2 indicates a rotatable or drive shaft.

3 is a disk having sleeved portion 4 adapted to be secured to the shaft.

5 is a spacing ring and 6 is a set screw adapted to fix the position of ring 5 and to secure sleeve portion 4 of disk 3 to shaft 2.

7 is a drum member provided with an upwardly projecting annular flange 8, the inner surface of the latter providing a friction surface adapted to be engaged by the gripping or clutching elements of the clutch mechanism.

9 are clutch shoes, the outer surfaces of which are concentric with the interior surface of flange 5 of drum wheel 7, the rear ends of each of said clutch shoes being formed with an interiorly extending arm portion 10, the said arm extending in a direction slightly rearwardly of the rear ends of said clutch shoes. And each of said arms 10 is provided with suitable openings as 11 for the insertion of a pivoting bolt 12, there being openings 11' in the disk 3 to secure the bolts 12. These bolts are for the clutch shoes and also for the levers 13, the outer ends of the latter being turned and extended in position to contact with the forward ends of clutch shoes 9 and are turned outwardly to provide greater surface contact. The inner ends of said levers extend into normal proximity to shaft 2, and their outer ends are similarly turned and extended for the purpose of greater surface contact with a cone member.

14 are spring members engaged at one end with lugs 15 on shoes 9 and at their other extremities with studs or pins 16 on disk 3, these springs serving to hold said shoes against centrifugal action when they are unclutched and to react against clutching when the clutch members are released.

17 refers generally to a shifting member loose on shaft 2 and provided with a circumferentially grooved portion 18 adapted to receive the fingers of a forked lever 19, the latter pivoted as at 20 to a suitable support and is adapted to shift member 17 lengthwise of shaft 2.

21 is a cone shaped member upon member 17, and is designed at times to engage with the inner ends of levers 12 to shift them radially from shaft 2 for the purpose of shifting shoes 9 about their turning center upon pivot bolts 12 to effect the eccentric action, resulting in the throwing of said clutch members into engagement with the friction surface of drum wheel 7, to effect the turning of the latter. A reverse movement of member 19 will cause a withdrawal of the cone member 21 and a corresponding release of levers 13 and springs 14 acting will result in the clutch members 9 being withdrawn from engagement with the clutch surface of said drum wheel 7.

The operation of the clutch is as follows: The parts of the service being disposed substantially as disclosed in Fig. 2, the operator moving lever 19 to the right, moving member 17 toward the clutch, will cause the cone member 21 thereof to engage the inner ends of levers 13, forcing them apart, causing the outer ends of said levers to swing clutch shoes 9 upon their pivot supports, and causing the clutch surface thereof to engage the clutch surface of drum wheel 7, causing the same to turn with the clutch members and the supporting disk 3 therefor. A reverse movement of lever 19 serves to release levers 13 and will similarly release clutch shoes 9, the springs 14 acting to pull said brake shoes out of engagement with the clutch surface of drum wheel 7, thus permitting the latter to come to rest.

While I have shown only two clutch shoes in the disclosed combination, I may use a greater number, if desired, and if so, will increase the number of shifting levers, thus carrying out the purposes and functions of my invention in the same manner and to the same effect.

I have disclosed herein my preferred form of embodiment of my invention; however, I do not desire to be limited to the details of construction herein shown but claim all forms thereof that fall within the principle herein disclosed.

What I claim is:

In a device of the class described, a shaft, a drum member rotatable at times in connection with said shaft, a carrying disk rigidly connected upon said shaft, a plurality of clutch shoe members eccentrically pivoted to said carrying disk, pivot pins for the clutch shoes, their friction surfaces concentric with the friction surface of the drum member, spring members connected with the disk and with each of said clutch shoes for holding the latter normally out of frictional contact with the drum member, lever members pivoted intermediate their ends upon the pivot pins for the clutch shoes, said lever members provided with portions at their outer ends to engage the free ends of the clutch shoes, and their inner ends extending into proximity to the shaft, a shiftable member on the shaft provided with a cone portion adapted to engage and shift the lever members to effect the movement of the clutch shoes in contact with the drum member and a suitable lever for moving said shiftable member lengthwise of said shaft.

In testimony whereof I have affixed my signature in presence of two witnesses.

SAMUEL W. RHOADS.

Witnesses:
JOHN P. HARPER,
JAMES C. COWSER.

Copies of this patent may be obtained for five cents each, by addressing the "Commissioner of Patents, Washington, D. C."